(12) United States Patent
Montante et al.

(10) Patent No.: US 6,666,087 B1
(45) Date of Patent: Dec. 23, 2003

(54) UNBALANCED FORCE SENSING APPARATUS

(75) Inventors: James M. Montante, St. Petersburg, FL (US); Christopher C. Hensley, Edmunds (GB)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 34 days.

(21) Appl. No.: 10/085,050

(22) Filed: Mar. 1, 2002

(51) Int. Cl.[7] .............................. G01M 1/16; G01M 1/00
(52) U.S. Cl. ............................ 73/460; 73/472; 73/471
(58) Field of Search .......................... 73/462, 471, 472; 310/90

(56) References Cited

U.S. PATENT DOCUMENTS

| | | | |
|---|---|---|---|
| 3,433,538 A | 3/1969 | Blanding et al. | 308/9 |
| 3,466,478 A | 9/1969 | Gail | 310/90 |
| 5,019,025 A | 5/1991 | Hayakawa et al. | 475/285 |
| 5,067,349 A | * 11/1991 | Hirchert | 73/472 |
| 5,110,268 A | 5/1992 | Sakurai et al. | 417/410 |

* cited by examiner

Primary Examiner—Hezron Williams
Assistant Examiner—Tamiko Bellamy
(74) Attorney, Agent, or Firm—John Tarlano

(57) ABSTRACT

An unbalanced force sensing apparatus for sensing an unbalanced force produced due to rotation of a cylindrical rotor, the apparatus including a shaft having gas passageways to convey a first gas against the inner surface of the rotor to support the rotor away from the shaft, a second gas for flowing over the outer surface of the rotor to rotate the rotor, and a force sensing means for sensing an unbalanced produced due to rotation of the rotor around the shaft.

8 Claims, 2 Drawing Sheets

UNBALANCED FORCE SENSING APPARATUS

BACKGROUND OF THE INVENTION

The present invention relates to apparatus and method for sensing for unbalanced force produced due to rotation of a cylindrical rotor.

In the present invention a rotor is supported away from a hydrostatic shaft by means of a first flowing gas. The first flowing gas passes through the interior of the hydrostatic shaft, through radial channels in the hydrostatic shaft, and between the rotor and hydrostatic shaft. The first flowing gas causes the rotor to be suspended over the hydrostatic shaft.

The rotor is rotated by means of a second flowing gas that flows over the outer surface of the cylindrical rotor. This second flowing gas causes the rotor to produce an unbalanced force if the cylindrical rotor in not uniform in mass throughout a cylindrical section of the rotor.

The rotating rotor produces a net centrifugal force that is transmitted to a force sensing device, if the overall mass of the rotor is not uniformly balanced. The net centrifugal force is produced due to an unbalanced mass of the rotating rotor. The net centrifugal force produces a force on the separation gas. This unbalanced force is detected by the disclosed unbalanced force sensing apparatus. An unbalanced mass of the rotor is determined from the detected unbalanced force.

A detected unbalanced mass of the rotor is balanced by grinding down one or more portions of the rotor. By alternate sensing and grinding steps, the rotor is very well balanced.

SUMMARY OF THE INVENTION

Unbalanced force sensing apparatus for sensing an unbalanced force produced due to rotation of a cylindrical rotor, comprising a shaft having radial gas passageways extending outward from a central longitudinal gas passageway in the shaft, the shaft having end portions, one of the end portions having a gas passageway, first gas supply means connected to the central longitudinal gas passageway of the shaft for suspending the cylindrical rotor over the shaft, second gas supply means for supplying a flowing gas over the cylindrical rotor, the flowing gas for rotating the cylindrical rotor, and force sensing means for sensing an unbalanced force produced due to rotation of the cylindrical rotor around the shaft.

DESCRIPTION OF THE PREFERRED EMBODIMENT

Figure 1:
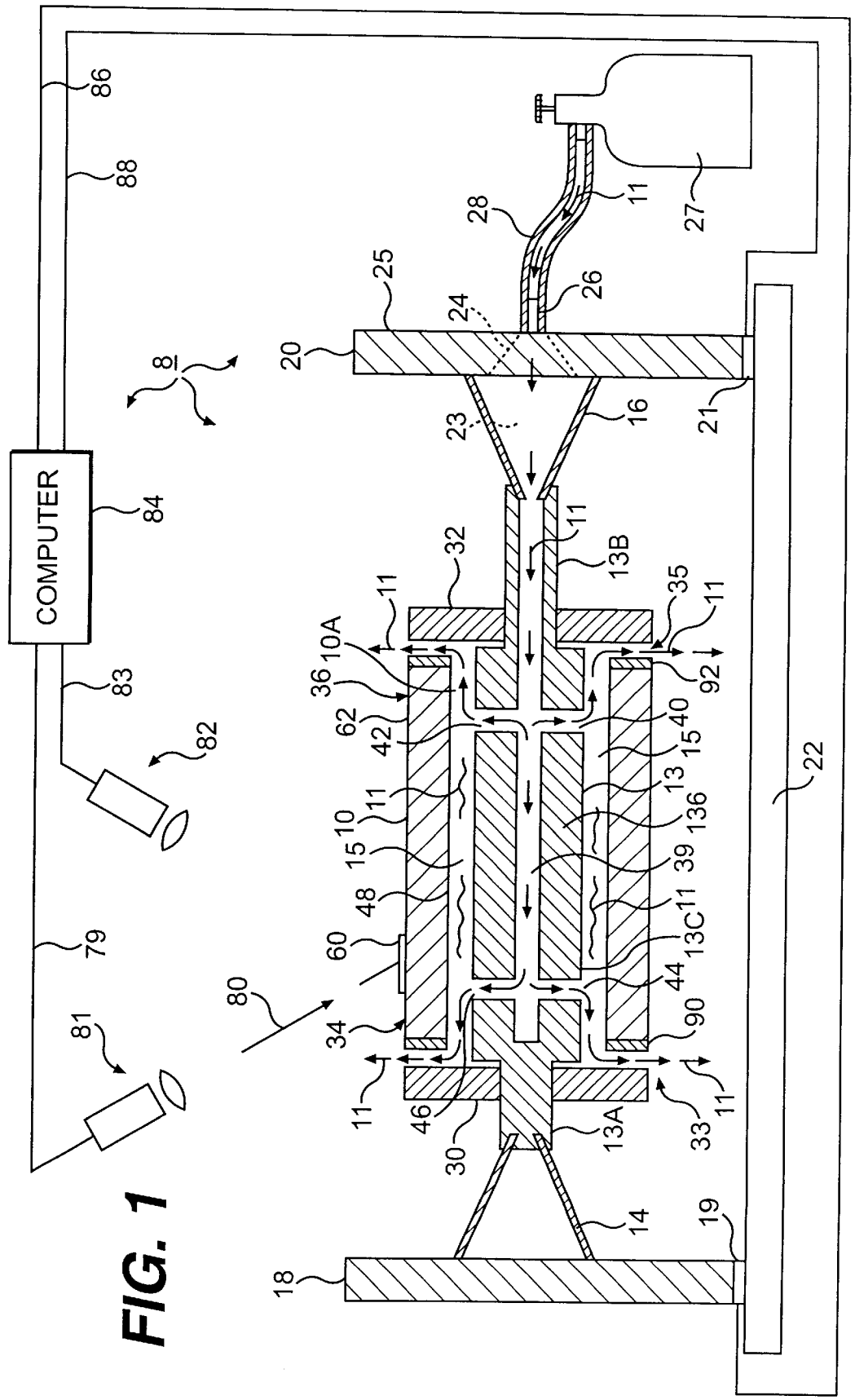
FIG. 1 is a frontal sectional view of apparatus for sensing an unbalanced force produced due to rotation of a cylindrical rotor.
Figure 2:
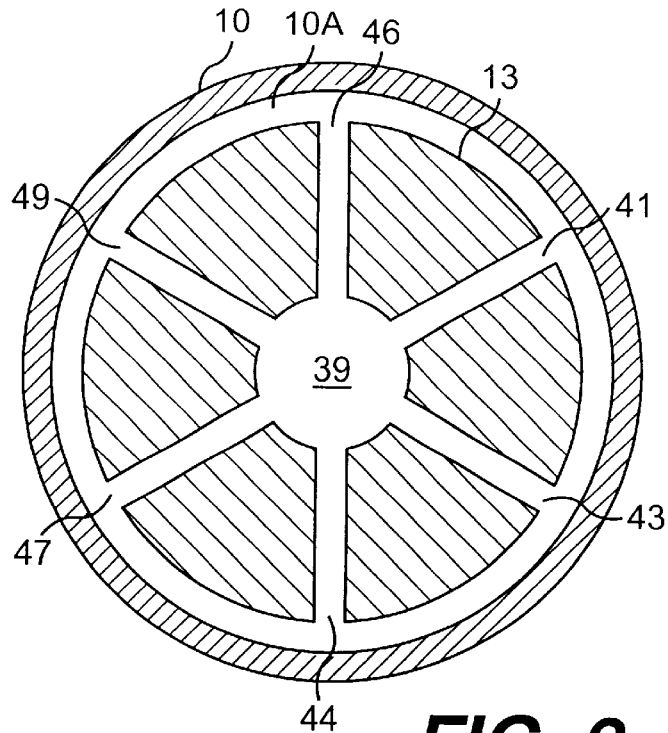
FIG. 2 is a sectional view of a section made perpendicularly through a longitudinal axis of a shaft 6f the apparatus of FIG. 1, at left radial passageways of the shaft that are shown in the frontal sectional view in FIG. 1.
Figure 3:
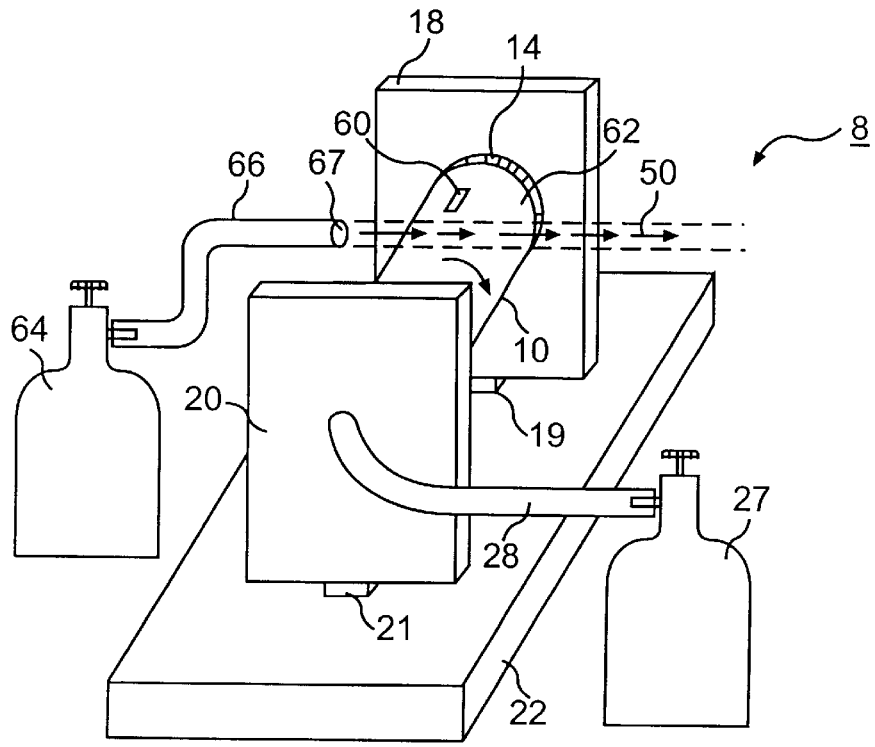
FIG. 3 is a perspective view of apparatus for sensing an unbalanced force produced due to rotation of a cylindrical rotor.

FIGS. 1 and 3 show unbalanced force sensing apparatus 8. Apparatus 8 is used to determine an amount and location of unbalanced mass of a cylindrical rotor 10 of a gyro. The cylindrical rotor 10 has an inner cylindrical hole 10A, as shown in FIG. 2. The cylindrical rotor 10 has grindable regions of mass that may be ground off in order to balance the rotor 10.

In FIG. 1, the rotor 10 is supported by a flowing suspending gas 11. Gas 11 flows within and through a cylindrical region 15 that is between the rotor 10 and a hollow hydrostatic shaft 13. The rotor 10 is suspended over the shaft 13 by gas 11. The hydrostatic shaft 13 has a hollow cylindrical end portion 13B, a solid cylindrical end portion 13A and a hollow central cylindrical section 13C. Hollow central cylindrical section 13C has a central longitudinal gas passageway 39. End portion 13B is tubular and has an opening to allow gas 11 to flow into the interior central longitudinal gas passageway 39 of the hollow hydrostatic shaft 13. The gas 11 exits shaft 13 through radial gas passageways, including radial gas passageways 40, 42, 44 and 46. The gas 11 acts as a gas bearing for the rotor 10. Gas 11 exists within spaces between rotor 10 and hydrostatic shaft 13. Such spaces include cylindrical region 15.

The end portions 13A and 13B of cylindrical shaft 13 are supported from within by conical support members 14 and 16. The conical support member 14 is connected to a support plate 18. The support plate 18 is connected to and rides on force sensor 19. The conical support member 16 is connected to support plate. 20. The support plate 20 is connected to and rides on force sensor 21. The force sensors 19 and 21 ride on platform 22.

The conical support member 16 has a gas passageway 23 therein. The conical support member 16 terminates within end portion 13B of shaft 13. The sensor plate 20 has a gas passageway 24 therein. The outside surface 25 of sensor plate 20 has a tubular connector 26 that is attached to the surface 25. The tubular connector 26 encompasses the right end of gas passageway 24. The tubular connector 26 is used to connect gas passageway 24, the gas passageway 23 and cylindrical region 15, to gas 11 from a pressurized gas container 27, by means of a highly flexible gas supply line 28.

The rotor 10 is centered over the hydrostatic shaft 13 by means of centering plates 30 and 32. Centering plate 30 is attached around and to partially hollow cylindrical end portion 13A. Centering plate 32 is attached within solid cylindrical end portion 13A. There is an annular space 33 between centering plate 30 and an end 34 of the rotor 10. The annular space 33 allows flowing gas 11 to slowly escape from between the end 34 of rotor 10 and centering plate 30. There is also an annular space 35 between an end 36 of rotor 10 and centering plate 32. The annular space 35 also allows flowing separation gas 11 to slowly escape from between the end 36 of rotor 10 and centering plate 32.

As shown in FIG. 2, the hydrostatic shaft 13 has a central longitudinal gas passageway 39 and radial gas passageways 41, 43, 44, 46, 47, and 49. These radial gas passageways are near end 34 of rotor 10. The hydrostatic shaft 13 has other similar radial gas passageways, including gas passageways 40 and 42 and four other gas passageways, near end 36 of rotor 10.

In operation, gas 11, such as nitrogen gas, is caused to flow at a regulated pressure out of pressurized gas container 27. The pressurized gas 11 flows through gas supply line 28. The gas 11 flows through gas passageway 24 of support plate 20. The gas 11 flows into and through gas passageway 23 of conical support member 16. The gas 11 then flows into central longitudinal gas passageway 39 of shaft 13. Still further, the gas 11 flows through radial gas passageways of shaft 13, including gas passageways 40, 42, 42 and 44, as shown in FIG. 1. Still further, the gas 11 flows into cylindrical region 15 between rotor 10 and shaft 13. The gas 11 buoys up the rotor 10 at all points on inner cylindrical surface 48 of rotor 10. The gas 11 holds rotor 10 away from shaft 13. Finally, the gas 11 passes out through annular spaces 33 and 35.

The gas 11 provides sufficient pressure on the inner surface 48 of rotor 10 to support the weight of the rotor 10 in a position such that the inner surface 48 of rotor 10 does not touch hydrostatic shaft 13. Rotor 10 can freely rotate around shaft 13.

The rotor 10 has a non-reflective mark 60 on its outer surface. Rotor 10 is made of a light reflective material. Non-reflective mark 60, on rotor 10, is shown in FIGS. 1 and 3.

The rotor 10 is rotated at a frequency f by passing a second gas 50 over the outside surface 62 of rotor 10, as shown in FIG. 3. The gas 50 comes from a gas tank 64, passes through a hose 66, and comes out of an end 67, as shown in FIG. 3.

The rotation of rotor 10 occurs after rotor 10 is made to ride on gas 11. An output from each of the force sensors 19 and 21 is recorded as the rotor 10 rotates. Again, the force sensors 19 and 21 ride on platform 22. The support plates 18 and 20 ride on sensors 19 and 21. The outputs of the force sensors 19 and 21 are synchronized with the position of the non-reflective mark 60, as rotor 10 rotates.

The rotor 10 is caused to rotate by means of gas 50 being passed over the rotor 10, as shown in FIG. 3. When rotor 10 is rotating, changes in direction of movement of atoms within rotating rotor 10 produce centrifugal forces on rotor 10, and oppositely directed centripetal forces on hydrostatic shaft 13. If rotating rotor 10 is not uniform in its dimensions or material, extra unbalanced mass M will exist along the axis of rotor 10. The unbalanced mass M, such as M1, will produce an unbalanced centrifugal force, such as F1, on rotating rotor 10 and an equal and opposite centripetal force F2 on shaft 13, while rotor 10 is rotating. The magnitude of the forces F1 and F2 depends on the frequency of rotation of rotor 10.

An unbalanced mass $M_1$ of rotor 10 that is near the end 34 of rotor 10 will produce an unbalanced centrifugal force $F_1$ on rotor 10. Force $F_1$ produces a force $F_2$ on shaft 13 since the force $F_1$ is applied to gas 11 near force sensor 19. The force $F_2$ is determined from recordings of forces sensed by force sensor 19.

Similarly, an unbalanced mass $M_2$ of rotor 10 that is near the end 36 of rotor 10 will produce an unbalanced centrifugal force $F_3$ on rotor 10. Force $F_3$ produces a force $F_4$ on shaft 13 since the force $F_3$ is applied to gas 11 near force sensor 21. The force $F_4$ is determined from recordings of forces sensed by force sensor 21.

$F_1=(M_1)(4)(PI)^2(f)^2(R)$ where $M_1$ is an unbalanced mass value at a point in the plane of FIG. 1 that is near the left end 34 of rotor 10, as shown. PI is approximately equal to 3.1416 in magnitude. R is the radius distance from the center, to the surface 62, of rotor 10.

$F_3=(M_2)(4)(PI)^2(f)^2(R)$ where $M_2$ is an unbalanced mass value at a point in the plane of FIG. 1 that is near the right end 36 of rotor 10, as shown.

Again, the centrifugal force $F_1$ produces a force $F_2$ on shaft 13. Force $F_2$ is due to a reaction to force $F_1$. Force $F_2$ is transmitted through the gas 11 to the shaft 13. The force $F_2$ is in line with the centrifugal force $F_1$. The force $F_2$ is applied to support plate 18 and is sensed by force sensor 19 below sensor plate 18.

The centrifugal force $F_3$ produces a force $F_4$ on shaft 13. $F_4$ is due to a reaction to force $F_3$. Force $F_4$ is transmitted through the separation gas 11 to shaft 13. The force $F_4$ is in line with the centrifugal force $F_3$. The force $F_4$ is applied to support plate 20 and is sensed by force sensor 21 below support plate 20.

The force sensors 19 and 21 can detect an unbalance mass $M_1$ or $M_2$, of an amount of less than 0.1 milligrams, for a rotor 10 having a radius R of 0.195 inches that is rotating at a frequency of 100 revolutions per minute.

Due to the use of the separation gas 11 between rotor 10 and shaft 13, the rotor 10 is symmetrically suspended around shaft 13. Such a suspension allows the balance sensors 19 and 21 to sense the reactive forces, such as $F_2$ and $F_4$, produced as a result of rotation of rotor 10. Thus unbalanced mass values, such as $M_1$ and $M_2$, of rotor 10 can be determined to a high degree. For instance $M_1=F2/\{(4)(PI)^2(f)^2(R)\}$ and $M_2=F4/\{(4)(PI)^2(f)^2(R)\}$.

The non-reflective mark 60 is painted with non-reflective paint onto a relatively small area of the exterior surface of the cylindrical rotor 10. Light 80 from a lamp 81 shines on rotor 10. Power for lamp 81 comes from a power output of a computer 84. Light 80A (not shown) is reflected from rotor 10 into a sensor 82 except when light 80 falls on non-reflective mark 60. An optical sensor 82 senses a break in reception of light 80A when light 80 falls on non-reflective mark 60. Such a break in reception of light 80A occurs each time the rotor 10 has rotated by 1 revolution, i.e. 360 degrees. Non-reflective mark 60 causes light 80 to not be reflected into optical sensor 82. The sensor 82 puts out a short break in electrical output, that is, a negative pulse, over line 83, each time the mark 60 comes around and light 80A is not sensed by sensor 82. The negative pulses on line 83 from sensor 83 are feed into computer 84. The computer 84 has an internal time clock. The time clock is used as a time standard against which the time of arrival of each negative electrical pulse is determined. The computer 84 determines the rate of rotation f of rotor 10 based on the times of arrival of the negative electrical pulses. Computer 84 uses the equation $f=1/(t_2-t_1)=1/DELTAT$ for this purpose, where $t_1$ and $t_2$ are the times of arrival of successive negative electrical pulses to computer 84. $DELTAT=(t_2-t_1)$.

The information on the rotational frequency f of rotor 10 is used in conjunction with the force data for reactive forces $F_2$ and $F_4$, that are obtained from sensors 19 and 21, to determine the values of unbalanced masses $M_1$ and $M_2$ on the ends 34 and 36 of rotor 10. Other reactive forces can be similarly be sensed and unbalanced masses on rotor 10 can similarly be determined.

Force value data inputs from the force sensors 19 and 21 are received by computer 84. Force value inputs that are proportional to the magnitudes of forces $F_1$ and $F_3$ are set to computer 84. The force value data inputs for $F_2$ and $F_4$ are analyzed by computer 84 using the equations $$M_1=F_2/[(4)(PI)^2(f)^2(R)] \text{ and } M_2=F_4/[(4)(PI)^2(f)^2(R)]$$

to determine the amounts unbalanced masses $M_1$ and $M_2$ of rotor 10. The computer 84 can also determine the location of the unbalanced measured masses $M_1$ and $M_2$, around rotor 10, since the times between the sensing of forces $F_2$ and $F_4$ and the sensing of the mark 60 can be determined.

The rotor 10 is made to rotate by passing a flowing rotating gas 50 over a central portion of the outside surface 62 of the rotor 10. The flow of the rotating gas 50 across the outside surface 62 of rotor 10 makes the rotor 10 rotate at a frequency f. Rotor 10 is rotated in a clockwise direction looking at rotor 10 from support plate 20. The rotor 10 can be made to rotate at a high frequency, f, of rotation.

The non-reflective mark 60 on the rotor 10 can be used with the optical sensor device 82 and computer 84 to determine an angle THETA1 between mark 60 and the location of an unbalanced mass $M_1$. A time difference DELTAT1 is used by computer 84, where DELTAT1=(t4–t3). t3 is a time that optical sensor 82 sends out a negative pulse due to non-reflective mark 60 breaking a reflection of light 80A into device 82. t4 is an immediate time thereafter that force sensor 19 sends out a signal to computer 84 due to sensing of force $F_2$, as the rotor 10 rotates. The mark 60 may be a very thin spot of non-reflective paint that breaks transmission of light 80A into optical sensor device 82 each time that rotor 10 rotates. Each time that a break in transmission of light 80A is first detected by optical sensor device 82, optical sensor device sends out a short negative pulse via line 83 to computer 84. By using the equation THEATA1= 2(PI)(f)(DELTAT1), computer 84 can determine the angle THEATA1 of unbalanced mass $M_1$ around rotor with respect to mark 60, in a counterclockwise direction.

The mark 60 on the rotor 10 can be used with the optical sensor device 82 to determine an angle THETA2 between mark 60 and an unbalanced mass $M_2$. A time difference DELTAT2 is used by computer 84, where the time difference DELTAT2=(t6–t5). t5 is the time that optical sensor 82 sends out a negative pulse due to non-reflective mark 60 breaking transmission of light 80A into device 82. t6 is an immediate time thereafter that force sensor 21 sends a signal to computer 84 due to sensing of force $F_4$, as the rotor 10 rotates. The non-reflective mark 60 may be a very thin spot of non-reflective paint that breaks transmission of light 80A coming into optical sensor device 82 each time that rotor 10 rotates. By using the equation THEATA2=2(PI)(f) (DELTAT2), computer 84 can determine the angle THEATA2 of unbalanced mass $M_2$ around rotor with respect to mark 60, in a counterclockwise direction.

The unbalanced measured mass $M_1$ is at angle THETA1 counterclockwise of mark 60. The unbalanced measured mass $M_1$ is at an angle that is clockwise of mark 60 at an angle 360 degrees minus THETA1. This is the position-around the circumference of the rotor 10 that an increased or unbalanced mass exists. Further the forces $F_2$ and $F_4$, detected by sensors 19 and 21, can be compared to determine how close to end 34 of rotor 10 that the unbalanced measured mass $M_1$ exists.

The unbalanced measured mass $M_2$ is at angle THETA2 counterclockwise of mark 60. The unbalanced measured mass $M_2$ is at an angle that is clockwise of mark 60 at an angle 360 degrees minus THETA2. This is the position around the circumference of the rotor 10 that an increased or unbalanced measured mass exists. Further the forces $F_2$ and $F_4$, detected by sensors 19 and 21, can be compared to determine how close to end 36 of rotor 10 that the unbalanced measured mass $M_2$ exists.

There is a grindable metal ring 90 at the left end 34 of the rotor 10, shown in FIG. 1. There is a grindable metal ring 92 at the right end 36 of the rotor 10, as shown in FIG. 1. The metal ring 90 is ground down at a spot longitudinally in line with measured mass $M_1$, if there is a previously unbalanced measured mass $M_1$ in the left half of rotor 10, to help in removing this measured unbalanced mass $M_1$, by removing material from the left half of rotor 10. The metal ring 92 is ground down at a spot longitudinally in line with measured mass $M_2$, if there is a previously unbalance measured mass $M_2$ in the right half of rotor 10, to help in removing this unbalanced measured mass $M_2$ by removing material from the right half of rotor 10. The grinding is done to a ring 90 or 92 along the outer edge of the rotor 10 longitudinally in line to where an unbalanced measured mass, $M_1$ or $M_2$, is located. These grindings are carried out using a grinding device, such as a dentists grinding device. Thus the material of the rings 90 and 92 is varied, to remove any unbalanced measured masses $M_1$ or $M_2$, or other unbalanced measured masses, in rotor 10.

Alternatively, the rotor 10 may be made of a grindable material, but without rings 90 and 92. In that situation, this material is ground from the rotor, if there is unbalanced measured mass, such as $M_1$ or $M_2$. The amount of material so ground would have a mass equal to the measured mass, such as $M_1$ or $M_2$. The point at which grinding is performed on rotor 10 is at the measured angle THETA1, for a measured mass $M_1$, or THETA2 for a measured mass $M_2$, from mark 60.

While the present invention has been disclosed in connection with the preferred embodiment thereof, it should be understood that there are other embodiments which fall within the spirit and scope of the invention as defined by the following claims.

What is claimed is:

1. Unbalanced force sensing apparatus for sensing an unbalanced force produced due to rotation of a hollow cylindrical rotor, comprising:

(a) a cylindrical shaft having radial gas passageways extending Perpendicularly outward from a central longitudinal gas passageway in the cylindrical shaft, a first set of the radial gas passageways being located at a common first longitudinal location of the central longitudinal gas passageway, the first set of radial gas passageways being separated from one another by a same angle, a second set of the radial gas passageways being located at a common second longitudinal location of the central longitudinal gas passageway, the second set of radial gas passageways being separated from one another by the same angle, the cylindrical shaft having end portions, one of the end portions having a beginning of the central longitudinal gas passageway;

(b) first gas supply means connected to the central longitudinal gas passageway of the cylindrical shaft for suspending the hollow cylindrical rotor over the cylindrical shaft, gas from the first gas supply means being emittable radially outward from the cylindrical shaft;

(c) second gas supply means for supplying a flowing gas over the hollow cylindrical rotor, the flowing gas for rotating the hollow cylindrical rotor; and (d) force sensing means for sensing an unbalanced force on the cylindrical shaft, the unbalanced force produced due to rotation of the hollow cylindrical rotor around the cylindrical shaft.

2. The apparatus of claim 1 wherein the first gas supply means comprises a pressurized gas container.

3. Unbalanced force sensing apparatus for sensing an unbalanced force produced due to rotation of a cylindrical rotor, comprising:

(a) a shaft having radial gas passageways extending outward from a central longitudinal gas passageway in the shaft, wherein the shaft has end portions, one of the end portions having a gas passageway, and wherein a centering plate is around each end portion of the shaft;

(b) first gas supply means connected to the central longitudinal gas passageway of the shaft for suspending the cylindrical rotor over the shaft;

(c) second gas supply means for supplying a flowing gas over the cylindrical rotor, the flowing gas for rotating the cylindrical rotor; and (d) force sensing means for sensing an unbalanced force on the shaft, the unbalanced force produced due to rotation of the cylindrical rotor around the shaft.

4. Unbalanced force sensing apparatus, comprising:

(a) a cylindrical rotor;

(b) a shaft within the cylindrical rotor, the shaft having radial gas passageways extending outward from a central longitudinal gas passageway in the shaft, the shaft having end portions, one of the end portions having a gas passageway;

(c) first gas supply means connected to the central longitudinal gas passageway of the shaft;

(d) a centering plate around each end portion of the shaft;

(e) second gas supply means for supplying a flowing gas over the rotor;

(f) shaft support means for supporting each end portion of the shaft, the shaft support means having a gas passageway therein for allowing transmission of gas from the first gas supply means to the shaft; and (g) force sensing means on the shaft support means, the force sensing means for sensing for unbalanced force on the shaft, the unbalanced force passing through the shaft support means, the unbalanced force produced due to rotation of the cylindrical rotor.

5. Unbalanced force sensing apparatus, comprising:

(a) a cylindrical rotor, a non-reflective mark being on an exterior surface of the cylindrical rotor;

(b) a shaft within the cylindrical rotor, the shaft having radial gas passageways extending outward from a central longitudinal gas passageway in the shaft, the shaft having end portions, one of the end portions having a gas passageway;

(c) first gas supply means connected to the central longitudinal gas passageway of the shaft, flowing gas from the first gas supply means passing outward through the radial passageways, the first flowing gas suspending the cylindrical rotor over from the shaft;

(d) a centering plate around each end portion of the shaft for further allowing flowing gas from the first gas supply means to suspend the cylindrical rotor over the shaft;

(e) second gas supply means for supplying a second flowing gas over the cylindrical rotor, the second flowing gas causing the cylindrical rotor to rotate around the shaft;

(f) a platform;

(g) force sensing means on the platform, the force sensing means for sensing for an unbalanced force on the shaft through shaft support means, such unbalanced force produced due to an unbalanced mass of the cylindrical rotor as the cylindrical rotor is rotated around the shaft be means of flowing gas from the second gas supply means, the force sensing means for sending out a signal having a value that is proportional to the strength of the sensed unbalanced force;

(h) the shaft support means being on the force sensing means for supporting the shaft away from the platform, the shaft support means having a gas passageway therein for allowing transmission of the flowing gas from the first gas supply means to the shaft;

(i) an optical detector means for sensing for a break in transmission of reflected light from the rotating cylindrical rotor, due to the non-reflective mark on the rotating cylindrical rotor, and for sending out a negative pulse each time that a break in the reflected light is sensed; and (j) a computer means for receiving the negative pulses from the optical detector means and for receiving signals from the force sensing means, the computer means determining the frequency at which the non-reflective mark rotates around a central axis of the cylindrical rotor as the cylindrical rotor rotates, by determining time between negative pulses, and for determining the amount of the unbalanced mass on the cylindrical rotor based on the signals from the force sensing means.

6. The apparatus of claim 5 wherein the shaft support means includes two support plates and two conical support members, the conical support members supporting the two end portions of the shaft, both a support plate and adjacent conical support member having a gas passageway, and wherein the force sensing means comprises a sensor for supporting each support plate, the force sensing means for sensing an amount of unbalanced force produced by an unbalanced mass as the cylindrical rotor is rotating.

7. The apparatus of claim 5 wherein the second gas supply means has a gas jet adjacent the exterior surface of the cylindrical rotor, the second flowing gas coming from the gas jet.

8. The apparatus of claim 5 wherein flowing gas from the first gas supply source flows through the shaft, and then passes between the shaft and the cylindrical rotor and then passes through openings between the cylindrical rotor and the centering plates to suspend the rotor over the shaft.

* * * * *